United States Patent
Mahaffey

(10) Patent No.: US 9,223,973 B2
(45) Date of Patent: *Dec. 29, 2015

(54) SYSTEM AND METHOD FOR ATTACK AND MALWARE PREVENTION

(71) Applicant: LOOKOUT, INC., San Francisco, CA (US)

(72) Inventor: Kevin Patrick Mahaffey, San Francisco, CA (US)

(73) Assignee: LOOKOUT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/455,787

(22) Filed: Aug. 8, 2014

(65) Prior Publication Data

US 2015/0106929 A1    Apr. 16, 2015

Related U.S. Application Data

(63) Continuation of application No. 13/741,988, filed on Jan. 15, 2013, now Pat. No. 8,881,292, which is a continuation of application No. 13/333,654, filed on Dec. 21, 2011, now Pat. No. 8,381,303, which is a continuation of application No. 12/255,621, filed on Oct. 21, 2008, now Pat. No. 8,108,933.

(51) Int. Cl.
*H04L 29/06* (2006.01)
*G06F 21/56* (2013.01)
(Continued)

(52) U.S. Cl.
CPC ............ *G06F 21/562* (2013.01); *G06F 21/564* (2013.01); *G06F 21/577* (2013.01); *H04W 12/08* (2013.01); *G06F 2221/034* (2013.01)

(58) Field of Classification Search
None
See application file for complete search history.

(56) References Cited

U.S. PATENT DOCUMENTS 3,416,032 A    12/1968  Jahns et al.
4,553,257 A    11/1985  Mori et al.
(Continued)

FOREIGN PATENT DOCUMENTS

GB          2430588          3/2007
WO      WO2005101789        10/2005
(Continued)

OTHER PUBLICATIONS

Richardson, Alexis, "Introduction to RabbitMQ", Google UK, available at http://www.rabbitmq.com/resources/google-tech-talk-final/alexis-google-rabbitmq-talk.pdf, retrieved on Mar. 30, 2012, 33 pages, published on Sep. 25, 2008.
(Continued)

*Primary Examiner* — Shin-Hon Chen
(74) *Attorney, Agent, or Firm* — Dergosits & Noah LLP

(57) ABSTRACT

A system and method for preventing malware attacks on mobile devices is presented. A server receives data from a mobile communications device and applies, by a known good component, logic on the data to determine if the data is safe. When the data is determined as being safe, the data is allowed to be processed by the mobile communications device. When the data is determined as not safe, a known bad component applies logic on the data to determine if the data is malicious. The data is rejected from being processed by the mobile communications device when the data is determined as being malicious. When the data is not malicious, a decision component performs an analysis on the data. If decision component determines the data to be safe, the data is allowed to be processed by the mobile communications device. Otherwise, the data is rejected from being processed.

23 Claims, 3 Drawing Sheets

NETWORK DATA OR DATA FILES

(51) Int. Cl.
*G06F 21/57* (2013.01)
*H04W 12/08* (2009.01)
*G06F 7/04* (2006.01)
*G06F 15/16* (2006.01)
*G06F 17/30* (2006.01)

(56) References Cited

U.S. PATENT DOCUMENTS

| | | |
|---|---|---|
| 5,319,776 A | 6/1994 | Hile et al. |
| 5,574,775 A | 11/1996 | Miller, II et al. |
| 5,715,518 A | 2/1998 | Barrere et al. |
| 6,185,689 B1 | 2/2001 | Todd et al. |
| 6,269,456 B1 | 7/2001 | Hodges et al. |
| 6,272,353 B1 | 8/2001 | Dicker et al. |
| 6,301,668 B1 | 10/2001 | Gleichauf et al. |
| 6,453,345 B2 | 9/2002 | Trcka et al. |
| 6,529,143 B2 | 3/2003 | Mikkola et al. |
| 6,696,941 B2 | 2/2004 | Baker |
| 6,792,543 B2 | 9/2004 | Pak et al. |
| 6,892,225 B1 | 5/2005 | Tu et al. |
| 6,907,530 B2 | 6/2005 | Wang |
| 6,959,184 B1 | 10/2005 | Byers et al. |
| 7,020,895 B2 | 3/2006 | Albrecht |
| 7,023,383 B2 | 4/2006 | Stilp et al. |
| 7,069,589 B2 | 6/2006 | Schmall et al. |
| 7,096,368 B2 | 8/2006 | Kouznetsov et al. |
| 7,123,933 B2 | 10/2006 | Poor et al. |
| 7,127,455 B2 | 10/2006 | Carson et al. |
| 7,159,036 B2 | 1/2007 | Hinchliffe et al. |
| 7,159,237 B2 | 1/2007 | Schneier et al. |
| 7,171,690 B2 | 1/2007 | Kouznetsov et al. |
| 7,178,166 B1 | 2/2007 | Taylor et al. |
| 7,181,252 B2 | 2/2007 | Komsi |
| 7,210,168 B2 | 4/2007 | Hursey et al. |
| 7,228,566 B2 | 6/2007 | Caceres et al. |
| 7,236,598 B2 | 6/2007 | Sheymov et al. |
| 7,237,264 B1 | 6/2007 | Graham et al. |
| 7,266,810 B2 | 9/2007 | Karkare et al. |
| 7,290,276 B2 | 10/2007 | Ogata |
| 7,304,570 B2 | 12/2007 | Thomas et al. |
| 7,305,245 B2 | 12/2007 | Alizadeh-Shabdiz |
| 7,308,256 B2 | 12/2007 | Morota et al. |
| 7,308,712 B2 | 12/2007 | Banzhof |
| 7,325,249 B2 | 1/2008 | Sutton et al. |
| 7,356,835 B2 | 4/2008 | Gancarcik et al. |
| 7,376,969 B1 | 5/2008 | Njemanze et al. |
| 7,386,297 B2 | 6/2008 | An |
| 7,392,043 B2 | 6/2008 | Kouznetsov et al. |
| 7,392,543 B2 | 6/2008 | Szor |
| 7,397,424 B2 | 7/2008 | Houri |
| 7,397,434 B2 | 7/2008 | Mun et al. |
| 7,401,359 B2 | 7/2008 | Gartside et al. |
| 7,403,762 B2 | 7/2008 | Morgan et al. |
| 7,414,988 B2 | 8/2008 | Jones et al. |
| 7,415,270 B2 | 8/2008 | Wilhelmsson et al. |
| 7,415,536 B2 | 8/2008 | Nakazawa |
| 7,433,694 B2 | 10/2008 | Morgan et al. |
| 7,467,206 B2 | 12/2008 | Moore et al. |
| 7,471,954 B2 | 12/2008 | Brachet et al. |
| 7,472,422 B1 | 12/2008 | Agbabian |
| 7,474,897 B2 | 1/2009 | Morgan et al. |
| 7,493,127 B2 | 2/2009 | Morgan et al. |
| 7,502,620 B2 | 3/2009 | Morgan et al. |
| 7,515,578 B2 | 4/2009 | Alizadeh-Shabdiz |
| 7,525,541 B2 | 4/2009 | Chun et al. |
| 7,526,297 B1 | 4/2009 | Holur et al. |
| 7,539,882 B2 | 5/2009 | Jessup et al. |
| 7,551,579 B2 | 6/2009 | Alizadeh-Shabdiz |
| 7,551,929 B2 | 6/2009 | Alizadeh-Shabdiz |
| 7,634,800 B2 | 12/2009 | Ide et al. |
| 7,685,132 B2 | 3/2010 | Hyman |
| 7,696,923 B2 | 4/2010 | Houri |
| 7,768,963 B2 | 8/2010 | Alizadeh-Shabdiz |
| 7,769,396 B2 | 8/2010 | Alizadeh-Shabdiz et al. |
| 7,774,637 B1 | 8/2010 | Beddoe et al. |
| 7,783,281 B1 | 8/2010 | Cook et al. |
| 7,809,353 B2 | 10/2010 | Brown et al. |
| 7,809,366 B2 | 10/2010 | Rao et al. |
| 7,809,936 B2 | 10/2010 | Einloth et al. |
| 7,813,745 B2 | 10/2010 | Li |
| 7,818,017 B2 | 10/2010 | Alizadeh-Shabdiz et al. |
| 7,835,754 B2 | 11/2010 | Alizadeh-Shabdiz et al. |
| 7,856,234 B2 | 12/2010 | Alizadeh-Shabdiz et al. |
| 7,856,373 B2 | 12/2010 | Ullah |
| 7,861,303 B2 | 12/2010 | Kouznetsov et al. |
| 7,907,966 B1 | 3/2011 | Mammen |
| 7,916,661 B2 | 3/2011 | Alizadeh-Shabdiz et al. |
| 7,991,854 B2 | 8/2011 | Bahl |
| 7,999,742 B2 | 8/2011 | Alizadeh-Shabdiz et al. |
| 8,014,788 B2 | 9/2011 | Alizadeh-Shabdiz et al. |
| 8,019,357 B2 | 9/2011 | Alizadeh-Shabdiz et al. |
| 8,031,657 B2 | 10/2011 | Jones et al. |
| 8,037,203 B2 | 10/2011 | Accapadi et al. |
| 8,054,219 B2 | 11/2011 | Alizadeh-Shabdiz |
| 8,087,082 B2 | 12/2011 | Bloch et al. |
| 8,089,398 B2 | 1/2012 | Alizadeh-Shabdiz |
| 8,089,399 B2 | 1/2012 | Alizadeh-Shabdiz |
| 8,090,386 B2 | 1/2012 | Alizadeh-Shabdiz |
| 8,099,764 B2 | 1/2012 | Herzog et al. |
| 8,108,555 B2 | 1/2012 | Awadallah et al. |
| 8,121,617 B1 | 2/2012 | LaGrotta et al. |
| 8,126,456 B2 | 2/2012 | Lotter et al. |
| 8,127,158 B2 | 2/2012 | Jessup et al. |
| 8,127,358 B1 * | 2/2012 | Lee .................................. 726/24 |
| 8,135,395 B2 | 3/2012 | Cassett et al. |
| 8,195,196 B2 | 6/2012 | Haran et al. |
| 8,259,568 B2 | 9/2012 | Laudermilch et al. |
| 8,261,351 B1 | 9/2012 | Thornewell et al. |
| 8,266,288 B2 | 9/2012 | Banerjee et al. |
| 8,266,324 B2 | 9/2012 | Baratakke et al. |
| 8,346,860 B2 | 1/2013 | Berg et al. |
| 8,356,080 B2 | 1/2013 | Luna et al. |
| 8,364,785 B2 | 1/2013 | Plamondon |
| 8,370,580 B2 | 2/2013 | Mobarak et al. |
| 8,370,933 B1 | 2/2013 | Buckler |
| 8,401,521 B2 | 3/2013 | Bennett et al. |
| 8,447,856 B2 | 5/2013 | Drako |
| 8,463,915 B1 | 6/2013 | Kim |
| 8,484,332 B2 | 7/2013 | Bush et al. |
| 8,504,775 B2 | 8/2013 | Plamondon |
| 2001/0044339 A1 | 11/2001 | Cordero et al. |
| 2002/0042886 A1 | 4/2002 | Lahti et al. |
| 2002/0087483 A1 | 7/2002 | Harif |
| 2002/0108058 A1 | 8/2002 | Iwamura |
| 2002/0183060 A1 | 12/2002 | Ko et al. |
| 2002/0191018 A1 | 12/2002 | Broussard |
| 2003/0028803 A1 | 2/2003 | Bunker et al. |
| 2003/0046134 A1 | 3/2003 | Frolick et al. |
| 2003/0079145 A1 | 4/2003 | Kouznetsov et al. |
| 2003/0115485 A1 | 6/2003 | Milliken et al. |
| 2003/0120951 A1 | 6/2003 | Gartside et al. |
| 2003/0131148 A1 | 7/2003 | Kelley et al. |
| 2004/0022258 A1 | 2/2004 | Tsukada et al. |
| 2004/0025042 A1 | 2/2004 | Kouznetsov et al. |
| 2004/0058644 A1 | 3/2004 | Saigo et al. |
| 2004/0133624 A1 | 7/2004 | Park |
| 2004/0158741 A1 | 8/2004 | Schneider |
| 2004/0185900 A1 | 9/2004 | McElveen |
| 2004/0199665 A1 | 10/2004 | Omar et al. |
| 2004/0209608 A1 | 10/2004 | Kouznetsov et al. |
| 2004/0225887 A1 | 11/2004 | O'Neil et al. |
| 2004/0259532 A1 | 12/2004 | Isomaki et al. |
| 2005/0010821 A1 | 1/2005 | Cooper et al. |
| 2005/0015443 A1 | 1/2005 | Levine et al. |
| 2005/0074106 A1 | 4/2005 | Orlamunder et al. |
| 2005/0076246 A1 | 4/2005 | Singhal |
| 2005/0091308 A1 | 4/2005 | Bookman et al. |
| 2005/0125779 A1 | 6/2005 | Kelley et al. |
| 2005/0130627 A1 | 6/2005 | Calmels et al. |
| 2005/0138395 A1 | 6/2005 | Benco et al. |
| 2005/0138413 A1 | 6/2005 | Lippmann et al. |
| 2005/0138450 A1 | 6/2005 | Hsieh |
| 2005/0154796 A1 | 7/2005 | Forsyth |
| 2005/0186954 A1 | 8/2005 | Kenney |

(56) References Cited

U.S. PATENT DOCUMENTS

| | | |
|---|---|---|
| 2005/0197099 A1 | 9/2005 | Nehushtan |
| 2005/0221800 A1 | 10/2005 | Jackson et al. |
| 2005/0227669 A1 | 10/2005 | Haparnas |
| 2005/0237970 A1 | 10/2005 | Inoue |
| 2005/0240999 A1 | 10/2005 | Rubin et al. |
| 2005/0254654 A1 | 11/2005 | Rockwell et al. |
| 2005/0278777 A1 | 12/2005 | Loza |
| 2005/0282533 A1 | 12/2005 | Draluk et al. |
| 2006/0026283 A1 | 2/2006 | Trueba |
| 2006/0073820 A1 | 4/2006 | Craswell et al. |
| 2006/0075388 A1 | 4/2006 | Kelley et al. |
| 2006/0080680 A1 | 4/2006 | Anwar et al. |
| 2006/0095454 A1 | 5/2006 | Shankar et al. |
| 2006/0101518 A1 | 5/2006 | Schumaker et al. |
| 2006/0130145 A1 | 6/2006 | Choi et al. |
| 2006/0150238 A1 | 7/2006 | D'Agostino |
| 2006/0150256 A1 | 7/2006 | Fanton et al. |
| 2006/0179485 A1 | 8/2006 | Longsine et al. |
| 2006/0217115 A1 | 9/2006 | Cassett et al. |
| 2006/0218482 A1 | 9/2006 | Ralston et al. |
| 2006/0224742 A1 | 10/2006 | Shahbazi |
| 2006/0236325 A1 | 10/2006 | Rao et al. |
| 2006/0253205 A1 | 11/2006 | Gardiner |
| 2006/0253584 A1 | 11/2006 | Dixon et al. |
| 2006/0272011 A1 | 11/2006 | Ide et al. |
| 2006/0277408 A1 | 12/2006 | Bhat et al. |
| 2006/0294582 A1 | 12/2006 | Linsley-Hood et al. |
| 2007/0005327 A1 | 1/2007 | Ferris |
| 2007/0011319 A1 | 1/2007 | Mcclure et al. |
| 2007/0015519 A1 | 1/2007 | Casey |
| 2007/0016953 A1 | 1/2007 | Morris et al. |
| 2007/0016955 A1 | 1/2007 | Goldberg et al. |
| 2007/0021112 A1 | 1/2007 | Byrne et al. |
| 2007/0028095 A1 | 2/2007 | Allen et al. |
| 2007/0028303 A1 | 2/2007 | Brennan |
| 2007/0028304 A1 | 2/2007 | Brennan |
| 2007/0038677 A1 | 2/2007 | Reasor et al. |
| 2007/0050471 A1 | 3/2007 | Patel et al. |
| 2007/0086476 A1 | 4/2007 | Iglesias et al. |
| 2007/0089165 A1 | 4/2007 | Wei et al. |
| 2007/0090954 A1 | 4/2007 | Mahaffey |
| 2007/0154014 A1 | 7/2007 | Aissi et al. |
| 2007/0174472 A1 | 7/2007 | Kulakowski |
| 2007/0174490 A1 | 7/2007 | Choi et al. |
| 2007/0186282 A1 | 8/2007 | Jenkins |
| 2007/0190995 A1 | 8/2007 | Wang et al. |
| 2007/0214245 A1 | 9/2007 | Hamalainen et al. |
| 2007/0214504 A1 | 9/2007 | Milani Comparetti et al. |
| 2007/0220608 A1 | 9/2007 | Lahti et al. |
| 2007/0240217 A1 | 10/2007 | Tuvell et al. |
| 2007/0240218 A1* | 10/2007 | Tuvell et al. ................ 726/24 |
| 2007/0240221 A1* | 10/2007 | Tuvell et al. ................ 726/24 |
| 2007/0240222 A1* | 10/2007 | Tuvell et al. ................ 726/24 |
| 2007/0248047 A1 | 10/2007 | Shorty et al. |
| 2007/0250627 A1 | 10/2007 | May et al. |
| 2007/0253377 A1 | 11/2007 | Janneteau et al. |
| 2007/0293263 A1 | 12/2007 | Eslambolchi et al. |
| 2007/0297610 A1 | 12/2007 | Chen et al. |
| 2008/0028470 A1 | 1/2008 | Remington et al. |
| 2008/0046369 A1 | 2/2008 | Wood |
| 2008/0046557 A1 | 2/2008 | Cheng |
| 2008/0047007 A1 | 2/2008 | Satkunanathan et al. |
| 2008/0049653 A1 | 2/2008 | Demirhan et al. |
| 2008/0065507 A1 | 3/2008 | Morrison et al. |
| 2008/0070495 A1 | 3/2008 | Stricklen et al. |
| 2008/0072329 A1 | 3/2008 | Herschaft et al. |
| 2008/0086773 A1 | 4/2008 | Tuvell et al. |
| 2008/0086776 A1 | 4/2008 | Tuvell et al. |
| 2008/0109871 A1 | 5/2008 | Jacobs |
| 2008/0127171 A1 | 5/2008 | Tarassov |
| 2008/0127179 A1 | 5/2008 | Moss et al. |
| 2008/0127334 A1 | 5/2008 | Gassoway |
| 2008/0127336 A1 | 5/2008 | Sun et al. |
| 2008/0132218 A1 | 6/2008 | Samson et al. |
| 2008/0134281 A1 | 6/2008 | Shinde et al. |
| 2008/0140767 A1 | 6/2008 | Rao et al. |
| 2008/0148381 A1 | 6/2008 | Aaron |
| 2008/0172746 A1 | 7/2008 | Lotter et al. |
| 2008/0178294 A1 | 7/2008 | Hu et al. |
| 2008/0181116 A1 | 7/2008 | Kavanaugh et al. |
| 2008/0186162 A1 | 8/2008 | Rajan et al. |
| 2008/0196104 A1 | 8/2008 | Tuvell et al. |
| 2008/0200160 A1 | 8/2008 | Fitzpatrick et al. |
| 2008/0208950 A1 | 8/2008 | Kim et al. |
| 2008/0209557 A1 | 8/2008 | Herley et al. |
| 2008/0235801 A1* | 9/2008 | Soderberg et al. .............. 726/25 |
| 2008/0276111 A1 | 11/2008 | Jacoby et al. |
| 2008/0293396 A1 | 11/2008 | Barnes et al. |
| 2008/0307243 A1 | 12/2008 | Lee |
| 2008/0318562 A1* | 12/2008 | Featherstone et al. ........ 455/418 |
| 2009/0070283 A1 | 3/2009 | Kang et al. |
| 2009/0172227 A1 | 7/2009 | Taylor et al. |
| 2009/0199298 A1 | 8/2009 | Miliefsky |
| 2009/0205016 A1 | 8/2009 | Milas |
| 2009/0205047 A1 | 8/2009 | Podjarny |
| 2009/0248623 A1 | 10/2009 | Adelman et al. |
| 2009/0292487 A1 | 11/2009 | Duncan et al. |
| 2009/0293125 A1* | 11/2009 | Szor ................................ 726/24 |
| 2010/0019731 A1 | 1/2010 | Connolly et al. |
| 2010/0041946 A1 | 2/2010 | Kim |
| 2010/0064341 A1 | 3/2010 | Aldera |
| 2010/0088398 A1 | 4/2010 | Plamondon |
| 2010/0097494 A1 | 4/2010 | Gum et al. |
| 2010/0100591 A1 | 4/2010 | Burgess et al. |
| 2010/0100939 A1 | 4/2010 | Burgess et al. |
| 2010/0100959 A1 | 4/2010 | Mahaffey |
| 2010/0100963 A1 | 4/2010 | Mahaffey et al. |
| 2010/0100964 A1 | 4/2010 | Burgess et al. |
| 2010/0138501 A1 | 6/2010 | Clinton et al. |
| 2010/0154032 A1* | 6/2010 | Ollmann ............................ 726/3 |
| 2010/0173658 A1 | 7/2010 | Fan et al. |
| 2010/0210240 A1 | 8/2010 | Mahaffey et al. |
| 2010/0240419 A1 | 9/2010 | Horino |
| 2010/0313270 A1* | 12/2010 | Kim et al. ...................... 726/24 |
| 2010/0317324 A1 | 12/2010 | Brown et al. |
| 2010/0332593 A1* | 12/2010 | Barash et al. ................. 709/203 |
| 2011/0047033 A1 | 2/2011 | Mahaffey et al. |
| 2011/0047594 A1 | 2/2011 | Mahaffey et al. |
| 2011/0047597 A1 | 2/2011 | Barton et al. |
| 2011/0047620 A1 | 2/2011 | Mahaffey et al. |
| 2011/0119765 A1 | 5/2011 | Burgess et al. |
| 2011/0145920 A1 | 6/2011 | Burgess et al. |
| 2011/0171923 A1 | 7/2011 | Daly et al. |
| 2011/0241872 A1 | 10/2011 | Mahaffey |
| 2011/0296510 A1 | 12/2011 | Hatlelid et al. |
| 2012/0042382 A1 | 2/2012 | Mahaffey |
| 2012/0060222 A1 | 3/2012 | Burgess et al. |
| 2012/0072569 A1 | 3/2012 | Xu |
| 2012/0084836 A1 | 4/2012 | Mahaffey et al. |
| 2012/0084864 A1 | 4/2012 | Burgess et al. |
| 2012/0096555 A1 | 4/2012 | Mahaffey |
| 2012/0110174 A1 | 5/2012 | Mahaffey et al. |
| 2012/0124239 A1 | 5/2012 | Shribman et al. |
| 2012/0159636 A1 | 6/2012 | Pandya et al. |
| 2012/0179801 A1 | 7/2012 | Luna et al. |
| 2012/0179814 A1 | 7/2012 | Swildens et al. |
| 2012/0188064 A1 | 7/2012 | Mahaffey et al. |
| 2012/0196571 A1 | 8/2012 | Grkov et al. |
| 2012/0215938 A1 | 8/2012 | Fletcher et al. |
| 2012/0233695 A1 | 9/2012 | Mahaffey et al. |
| 2012/0246499 A1 | 9/2012 | Jessup et al. |
| 2012/0259954 A1 | 10/2012 | McCarthy et al. |
| 2012/0278467 A1 | 11/2012 | Schneider |
| 2012/0303735 A1 | 11/2012 | Raciborski et al. |
| 2012/0317153 A1 | 12/2012 | Parthasarathy et al. |
| 2012/0317233 A1 | 12/2012 | Redpath |
| 2012/0317370 A1 | 12/2012 | Luna |
| 2012/0324076 A1 | 12/2012 | Zerr et al. |
| 2012/0324094 A1 | 12/2012 | Wyatt et al. |
| 2012/0324259 A1 | 12/2012 | Aasheim et al. |
| 2012/0324568 A1 | 12/2012 | Wyatt et al. |
| 2013/0013775 A1 | 1/2013 | Baumback et al. |
| 2013/0055405 A1* | 2/2013 | Zhao et al. ...................... 726/26 |
| 2013/0276124 A1* | 10/2013 | Tahir et al. ...................... 726/25 |

(56) References Cited

U.S. PATENT DOCUMENTS

FOREIGN PATENT DOCUMENTS

| WO | WO2006110181 | 10/2006 |
|---|---|---|
| WO | WO2007081356 | 7/2007 |
| WO | WO2008007111 | 1/2008 |
| WO | WO2008057737 | 5/2008 |
| WO | WO2010048218 | 4/2010 |
| WO | WO2010048220 | 4/2010 |
| WO | WO2012027588 | 1/2012 |

OTHER PUBLICATIONS

Fisher, Oliver, "Malware? We Don't Need No Stinking Malware!", Google, available at http://googlewebmastercentral.blogspot.com/2008/10/malware-we-dont-need-no-stinking.html, retrieved on Mar. 30, 2012, published on Oct. 24, 2008, 11 pages.
Reardon, Marguerite, "Mobile Phones That Track Your Buddies," Cnet, available at <http://news.cnet.com/Mobile-phones-that-track-your-buddies/2100-1039_3-6135209.html, retrieved Mar. 30, 2012, published on Nov. 14, 2006, 6 pages.
Fette, Ian "Understanding Phishing and Malware Protection in Google Chrome," The Chromium Blog, available at http://blog.chromium.org/2008_11_01_archive.html, retrieved on May 17, 2011, published on Nov. 14, 2008, 6 pages.
Kincaid, Jason "Urban Airship Brings Easy Push Notifications to Android," TechCrunch, available at http://techcrunch.com/2010/08/10/urban-airship-brings-easy-push-notifications-to-android/, retrieved on Jun. 16, 2011, published on Aug. 10, 2010, 5 pages.
Keane, Justin K. "Using the Google Safe Browsing API from PHP," Mad Irish, Aug. 7, 2009, available at http://www.madirish.net/node/245, retrieved Mar. 30, 2012, published on Aug. 7, 2009, 5 pages.
Jefferies, Charles P. "Webroot AntiVirus 2010 With Spy Sweeper Review," Notebook Review, available at http://www.notebookreview.com/default.asp?newsID=5700 &review=Webroot+AntiVirus+2010+With+Spy+Sweeper+Review, retrieved on May 18, 2011, published on Jun. 22, 2010, 3 pages.
"Berry Locator", available at http://www.mobireport.com/apps/bl/, retrieved on Aug. 10, 2011, published Feb. 8, 2008.
Wikipedia, "Firefox Browser", available at http://en.wikipedia.org/wiki/Firefox_browser, retrieved on Aug. 10, 2011, published on Dec. 15, 2005.
F-Secure, "F-Secure Mobile Security for S60 Users Guide", pp. 1-34, retrieved on Aug. 10, 2011, published on Jan. 26, 2009.
Wikipedia, "Java Virtual Machine", available at http://en.wikipedia.org/wiki/Java_virtual_machine, retrieved on Aug. 10, 2011, published on Dec. 9, 2003.
Kaspersky "Kaspersky Mobile Security", available at http://usa.kaspersky.com/products-services/home-computer-security, published on Jan. 1, 2007, retrieved on Oct. 21, 2008.
"Kaspersky Mobile Security", Kaspersky Lab 2008, available at http://www.kaspersky.com/kaspersky_mobile_security, retrieved on Sep. 11, 2008, published on Jun. 22, 2010, 3 Pages.
Symantec, "Symantec Norton Smartphone Security", available at http://www.symantec.com/norton/smartphone_security, retrieved on Oct. 21, 2008, published on Jan. 1, 2007.
"PhoneBak PDA Phone Anti-theft software for your PDA phone", 2007, Bak2u Pte Ltd (Singapore) pp. 1-4.
"PhoneBak: Mobile Phone Theft Recovery Software", 2007, Westin Tech.
Symantec, "Symantec Endpoint Security, Data Sheet and Product Screen Shot", retrieved on Oct. 21, 2008, published on Jun. 15, 2008.
Symantec, "Symantec Mobile Security Suite for Windows Mobile, Data Sheet and Product Screen Shot", available at http://www.symantec.com/norton/smartphone_security, retrieved on Oct. 21, 2008, published on Mar. 1, 2008.
TippingPoint "TippingPoint Security Management System (SMS)", available at http://www.tippingpoint.com/products_sms.html, retrieved on Oct. 21, 2008, published on Mar. 31, 2005, 2 pages.

Summerson, Cameron "5 Android Antivirus Apps Compared, Find Out Which Ones Are Worth Having!," Android Headlines, available at http://androidheadlines.com/2011/03/5-android-antivirus-apps-comapred-find-out-which-ones-are-worth-having.html, retrieved on Mar. 30, 2012, published on Mar. 8, 2011, 9 pages.
"Android Cloud to Device Messaging Framework," Google Code Labs, available at http://code.google.com/android/c2dm/, retrieved on Sep. 14, 2011, published on Apr. 11, 2011, 9 pages.
"BlackBerry Push Service Overview," available at http://us.blackberry.com/developers/platform/pushapi.jsp#tab_tab_resources, retrieved on Sep. 14, 2011, published on Nov. 6, 2010, 21 pages.
"eSoft unveils SiteFilter 3.0 for OEMs," Infosecurity, Mar. 23, 2010, available at http://www.infosecurity-magazine.com/view/8273/esoft-unveils-sitefilter-30-for-oems/, retrieved on Mar. 30, 2012, published on Mar. 23, 2010, 2 pages.
"Get the Physical Location of Wireless Router From its MAC Address (BSSID)," Coderrr, available at http://coderrr.wordpress.com/2008/09/10/get-the-physical-location-of-wireless-router-from-its-mac-address-bssid/, retrieved on Mar. 30, 2012, published on Sep. 12, 2008, 13 pages.
"Hooking—Wikipedia, the Free Encyclopedia," Wikipedia, available at http://web.archive.org/web/20100415154752/http://en.wikipedia.org/wiki/Hooking, retrieved Mar. 30, 2012, published on Apr. 15, 2010, 6 pages.
Mytton, David "How to Build an Apple Push Notification Provider Server (Tutorial)," Server Density, available at http://blog.serverdensity.com/2009/07/10/how-to-build-an-apple-push-notification-provider-server-tutorial/, retrieved on Apr. 2, 2012, published on Jul. 10, 2009, 33 pages.
"Pidgin the Universal Chat Client," Pidign, available at http://www.pidgin.im/, retrieved Sep. 14, 2011, published on May 1, 2007, 14 pages.
Pogue, David "Simplifying the Lives of Web Users," The New York Times, available at http://www.nytimes.com/2010/08/19/technology/personaltech/19pogue.html, retrieved May 17, 2011, Published on Aug. 18, 2010, 5 pages.
"Twilio Cloud Communications Web Service API for Building Voice and SMS Applications," Twilio, available at http://www.twilio.com, retrieved Sep. 14, 2011, published on Jun. 5, 2008, 12 pages.
"Understanding Direct Push," Microsoft, Feb. 18, 2009, available at http://technet.microsoft.com/en-us/library/aa997252(v=exchg.80).aspx, retrieved on Mar. 30, 2012, published on Feb. 18, 2009, 3 pages.
"Urban Airship: Powering Modern Mobile," available at http://urbanairship.com/products/, retrieved on Sep. 16, 2011, published on Feb. 19, 2010, 14 pages.
"zVeloDB URL Database," zVelo, available at https://zvelo.com/technology/zvelodb-url-database, retrieved Mar. 30, 2012, published on Jan. 21, 2012, 2 pages.
Amazon.com: Mining the Web Discovering Knowledge from Hypertext Data (9781558607545): Soumen Chakrabarti: Books, Amazon available at http://www.amazon.com/exec/obidos/ASIN/1558607544/, retrieved on Jun. 7, 2012, published on Dec. 13, 2001, pp. 1-7.
Clickatell, available at http://www.clickatell.com, retrieved Sep. 14, 2011, published on Jan. 18, 2011, 11 pages.
Dashwire: Manage Your Cell Phone on the Web, News Blog, with Jessica Dolocourt, Oct. 29, 2007, 5:00am PDT <http://news.cnet.com/8301-10784_3-9805657-7.html> retrieved Jun. 15, 2009; pp. 1-3.
Diligenti, M., et al. Focused Crawling Using Context Graphs:, Proceedings of the 26th VLDB Conference, Cairo, Egypt, pp. 1-8, available at www.vldb.org/conf/2000/P257.pdf, retrieved on Oct. 21, 2008, published on Sep. 10, 2000.
Grafio "Stay Secure", available at http://widgets.opera.com/widget/4405/, retrieved Oct. 21, 2008, published on Sep. 29, 2008.
McAfee, Internet Archive, Way Back Machine, available at <http://web.archive.org/web/20080611095201/www.qualys.com/solutions/vulnerability_management>retrieved Feb. 24, 2011, 1 page.
HTC "Mobile Wipe Smart Phone Management", pp. 1-4, published on Dec. 5, 2007, retrieved on Dec. 5, 2007.
PagerDuty, available at http://www.pagerduty.com, retrieved on Sep. 14, 2011, published on Jun. 6, 2009, 23 pages.

(56) References Cited

OTHER PUBLICATIONS

PCT "International Search Report and Written Opinion of the International Searching Authority for PCT/US2009/061370", mailed on Dec. 14, 2009.
PCT "International Search Report and Written Opinion of the International Searching Authority for PCT/US2009/061372", mailed on Mar. 24, 2010; received on Mar. 29, 2010.
PCT, "International Search Report and Written Opinion of the International Searching Authority for PCT/US2011/049182", mailed on Dec. 23, 2011.
Prey, available at http://preyproject.com/, retrieved Jan. 10, 2012, published on May 16, 2009, 4 pages.
Qualys, "Executive Dashboard," Internet Archive, Way back Machine, availble at <http://web.archive.org/web20080507161417/www.qualys.com/products/screens/?screen=Executive + Dashboard>, retrieved Feb. 23, 2011, 1 page.
Qualys, "Vulnerability Management," Internet Archive, Way Back Machine, available at <http://web.archive.org/web/20080611095201/www.qualys.com/solutions/vulnerability_management> Retrieved Feb. 24, 2011, 1 page.
Real world Computing, Jun. 16, 2008 (PC Pro), pp. 1-2.
Simone, "Playing with ActiveMQ," Mostly Useless, available at http://www.mostly-useless.com/blog/2007/12/27/playing-with-activemq/, retrieved Mar. 30, 2012, published on Dec. 27, 2007, 6 pages.
Teh, Joe, "Norton 360 Version 3.0 Review," Mar. 9, 2009, Available at <http://techielobang-com/blog/2009/03/09/norton-360-version-30-review/> Retrieved Feb. 23, 2011, 12 pages.
Trillian, available at http://www.trillian.im/, retrieved on Sep. 14, 2011, published on Oct. 11, 2007, 24 pages.

\* cited by examiner

SYSTEM AND METHOD FOR ATTACK AND MALWARE PREVENTION

CROSS REFERENCE TO RELATED APPLICATIONS

The present application is a continuation of U.S. patent application Ser. No. 13/741,988, entitled "SYSTEM AND METHOD FOR ATTACK AND MALWARE PREVENTION," filed Jan. 15, 2013, which is a continuation of U.S. patent application Ser. No. 13/333,654, entitled "SYSTEM AND METHOD FOR ATTACK AND MALWARE PREVENTION," filed Dec. 21, 2011, now U.S. Pat. No. 8,381,303, which is a continuation of U.S. patent application Ser. No. 12/255,621, entitled "SYSTEM AND METHOD FOR ATTACK AND MALWARE PREVENTION," filed Oct. 21, 2008, now U.S. Pat. No. 8,108,933, and is related to the following co-pending U.S. Patent Applications: U.S. patent application Ser. No. 12/255,635, entitled "SECURITY STATUS AND INFORMATION DISPLAY SYSTEM," now U.S. Pat. No. 8,060,936, U.S. application Ser. No. 12/255,632, entitled "SECURE MOBILE PLATFORM SYSTEM,", now U.S. Pat. No. 8,087,067, U.S. patent application Ser. No. 12/255,626, entitled "SYSTEM AND METHOD FOR A Mobile Cross-Platform Software System," now U.S. Pat. No. 8,099,472 and U.S. patent application Ser. No. 12/255,614, entitled "SYSTEM AND METHOD FOR MONITORING AND ANALYZING MULTIPLE INTERFACES AND MULTIPLE PROTOCOLS," now U.S. Pat. No. 8,051,480, all of which are hereby incorporated by reference.

FIELD

The present invention relates generally to data security, specifically, to preventing and detecting attacks on a mobile communications device.

BACKGROUND

There are many ways for protecting computing assets from the harmful effects of viruses, malware, adware, exploits, and other computer contaminants (also known collectively as "attacks"). Desktop, laptop and server computers enjoy numerous antivirus, network, and similar security software products that are able to detect security threats such as exploits, viruses, and malware. The detection of known viruses and malware often involves identifying the software code signatures or definitions of known viruses and malware, storing these signatures or definitions in a database on the computer, and comparing data with these signatures or definitions in order to determine whether or not the data contains a virus or malware. Detecting previously unknown viruses and malware may often involves analyzing data for certain characteristics or emulating the execution of data to determine what it would do if allowed to run on the host system. Identifying new attacks is a matter of updating a virus definition or virus signature database on the computer or modifying the rules associated with an unknown virus/malware detection system. This is feasible since computers have the hardware, software and memory resources to store and manage vast virus signature databases, as well as the processing resources to perform complicated analyses and emulate an execution environment. The detection of exploits or other attacks that can compromise a computer via a network often involves identifying the signatures of known exploits or attack, storing a database of signatures on the computer being protected, and comparing network data to these signatures in order to determine if the data contains a security threat. Like virus and malware signatures, network attack signatures can be updated in order to detect new security threats. As mentioned previously, such a system is made possible because computers have the computational and storage resources available to manage large attack signature databases and compare network data to many signatures before approving it.

Mobile communications devices lack the same power as computers, though they are often designed to provide some of the same functionalities as computers in a portable form. In order to provide these functionalities, mobile communications devices often retain a mobile or portable version of a desktop computer operating system or system architecture, such as Windows Mobile®, Apple OS X iPhone™ or Java® ME. As a result, some attacks directed to a traditional computer can easily translate or be modified to harm a mobile communications device. Additionally, the number and types of attacks specifically directed to the mobile communications device platform is growing.

Detecting attacks on a mobile communications device presents challenges not found on traditional computing platforms. As previously mentioned, mobile communications devices lack the hardware, software and memory resources of a traditional computer. As such, storing vast signature databases on the mobile communications device is not feasible, and running complicated analysis systems strains the device's memory, battery, and CPU. Other security solutions have been found unsuccessful at detecting attacks specifically directed to a mobile communications device, since mobile communications devices provide functionalities not found on traditional computers. For example, a mobile communications device may be attacked via network data, files, or executables received over various network interfaces such as Bluetooth, Wi-Fi, infrared, or cellular networks.

The lack of robust antivirus and attack preventative measures on mobile communications devices has serious security implications. Mobile devices are part of a critical infrastructure: as people depend on such devices to communicate, transmit and receive data, and access Internet and intranet websites, it becomes more important that these devices remain secure. If not protected, a significant portion of mobile devices may be vulnerable to criminal or cyber-terrorist attacks that could disrupt the normal functioning of both commerce and government. One skilled in the art could easily disrupt vital communications, use mobile communications devices to hack into supposedly secure servers storing confidential information, steal money via mobile payment mechanisms, or perform a host of other malicious and nefarious acts.

What is therefore needed is a way to prevent attacks and protect mobile communications devices without sacrificing device performance.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

The present invention is a system and method for evaluating data on a mobile communications device to determine if it presents a security threat. In an embodiment, the present invention provides a mobile communications device with a mechanism for rejecting data that is immediately recognized to be an attack, and for allowing receipt of data recognized to be safe. In addition, the present invention provides a way for the mobile communications device to evaluate data that is not immediately recognized as safe or malicious. The present invention functions on a mobile communications device notwithstanding any hardware, software or memory constraints inherent in the device. As used herein, a "mobile communications device" may refer to a cell phone, handset, smartphone, PDA, and the like. A mobile communications device may primarily be used for voice communications, but may also be equipped to receive and transmit data, including email, text messages, video, and other data. This data may be received as packets or streams.

It should be appreciated that the present invention can be implemented in numerous ways, including as a process, an apparatus, a system, a device, a method, or a computer readable medium such as a computer readable storage medium comprising computer program instructions or a computer network wherein computer program instructions are sent over optical or electronic communication links. Applications, software programs or computer readable instructions may be referred to as components or modules. Applications may take the form of software executing on a general purpose computer or be hardwired or hard coded in hardware. In this specification, these implementations, or any other form that the invention may take, may be referred to as techniques. In general, the order of the steps of disclosed processes may be altered within the scope of the invention.

A. System Architecture

Figure 1:
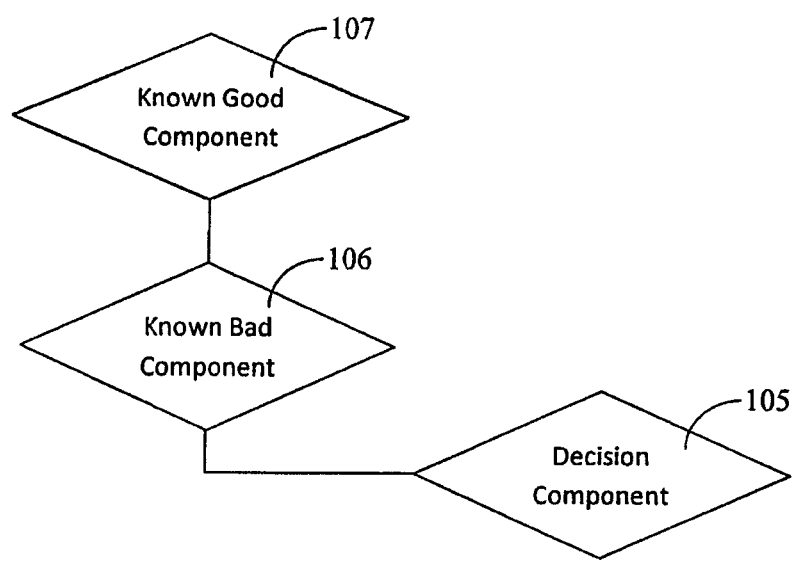
FIG. 1 is an exemplary block diagram depicting one embodiment of the present invention.

In an embodiment, the present invention is comprised of at least three software components resident on a mobile communications device. As shown in FIG. 1, a first component 107 may be used to recognize data that is safe, or "known good." A second component 106 may be used to recognize data that is malicious, or "known bad." A third component 105 is a decision component that may be used to evaluate data that is neither known good nor known bad. Each of these components is discussed in more detail below.

One will appreciate that as referred to herein, data may include network data, files, executable and non-executable applications, emails and other types of objects that can be transmitted to or received by a mobile communications device. Mobile communications devices typically transmit and receive data through one or more network interfaces, including Bluetooth, WiFi, infrared, radio receivers, and the like. Similarly, data may be encapsulated in a layered communications protocol or set of protocols, such as TCP/IP, HTTP, Bluetooth, and the like. In order to evaluate the security threat level of the data, it may be necessary to identify or parse the one or more protocols used to encapsulate the data. This may be done using a system such as the one described in co-pending U.S. patent application Ser. No. 12/255,614, entitled "SYSTEM AND METHOD FOR MONITORING AND ANALYZING MULTIPLE INTERFACES AND MULTIPLE PROTOCOLS," now U.S. Pat. No. 8,051,480 which is hereby incorporated by reference in full herein.

In addition, one will appreciate that data can vary in size and complexity depending upon its source, destination and purpose. It may be difficult to analyze received data objects as a whole; therefore, in order to optimize resources on the mobile communications device platform, the present invention may apply hashing functions or hashing algorithms to the received data. A hashing algorithm will transform the data into a fixed length identifier for easier evaluation. Applying the hash function may be performed by any of the components in the system illustrated in FIG. 1, or alternatively, may simply be performed by the system itself.

Hashed data may then be submitted to some or all of the three components for categorization and further action, if necessary. For example, the known good component 107 may have access to or may associate with a stored database of known good hash identifiers. As discussed herein, the database may be a data store or table of known good hash identifiers, or may be logic providing a comparison against hash identifiers for known good data. When data is analyzed by the mobile communications device, it may be quickly hashed and compared against this stored database by the known good component. This database may include identifiers for data that has been analyzed before and been deemed safe, originates from a trustworthy source, or simply recognized as good based upon its characteristics. This may include an examination of the data's structure, statefulness, purported source and destination, etc. If there is a match against the known good hash identifier database, then the data may be categorized as known good, and no further analysis is necessary. This data may then be allowed to pass to its intended destination for processing, execution or other operation.

A person skilled in the art will appreciate that since the total number of known good applications for mobile communications devices is small, use of the known good component 107 coupled to a database of known good application identifiers may significantly reduce false-positive malware detection. One will also appreciate that use of a known good component 107 may be particularly effective for data that contains executable software code. Executable software code for a given application rarely changes between different mobile communications devices, so creating a database of known good hash identifiers or logic for evaluating known good hash identifiers may be an effective method for recognizing safe or trustworthy data. This database may vary in size depending upon the resources available on the mobile communications device. Alternatively, aspects of the present invention, such as the known good component, may have access to a remote server with a larger library of hash identifiers for known good data or applications. Additionally, as discussed further in the next section, known good component 107 may be able to evaluate the security of data depending upon whether the data possesses sufficient characteristics common to other known good data.

The second component of the system embodiment of the present invention may include a component capable of recognizing if received data is malicious, or "known bad" (106 in FIG. 1). Known bad component 106 may have access to a database, logic or other data store containing information on known attack signatures or definitions that can be stored on the mobile communications device without occupying a significant amount of memory. For example, virus or other malware signatures can be reduced to hashing identifiers and stored in a database. In other words, there may be a known bad hash identifier database that complements the known good hash identifier database stored on the mobile communications device. Additionally or alternatively, known bad component 106 may be capable of identifying malware using characteristics common to other malicious software code. When applied to network data or data files, known bad component 106 may have access to a database containing patterns or other characteristics of a protocol data unit or file format which presents a security threat. Similar to the known good component 107 and database, any data identified as containing malware may be deleted, quarantined, or rejected from further processing by the mobile communications device. If a known bad data object is detected, the present invention may also display a notification or other message similar to that described in co-pending U.S. patent application Ser. No. 12/225,635, entitled "SECURITY STATUS AND INFORMATION DISPLAY SYSTEM," incorporated in full herein.

The third component of the system embodiment of the present invention may be a decision component 105. This component may be used to evaluate data that cannot be characterized as either known good or known bad. Since a majority of the data received on the mobile communications device may fall within this category, this component may utilize most of the resources allocated to the system embodiment of the present invention. This component may apply fuzzy logic, heuristic or other methods of analysis in order to determine whether received data may be passed to its intended destination, or rejected to prevent harm from befalling the device. Examples of this analysis are discussed below.

One will appreciate that the system embodiment may exist independently on a mobile communications device, or may be incorporated into an existing security system on the mobile communications device such as the one in co-pending U.S. patent application Ser. No. 12/255,614. One will also appreciate that in order to implement the present invention on a variety of mobile communications device platforms, it may be necessary to program aspects of the present invention using a cross-platform system, such as the one disclosed in U.S. patent application Ser. No. 13/313,937, entitled "SYSTEM AND METHOD FOR A MOBILE CROSS PLATFORM SOFTWARE SYSTEM," now U.S. Pat. No. 8,271,608, incorporated by reference in full herein. In addition, aspects of the present invention may be used to determine a security state for a mobile communications device, as is described in U.S. patent application Ser. No. 12/255,632, entitled "SECURE MOBILE PLATFORM SYSTEM," now U.S. Pat. No. 8,087,067 incorporated by reference in full herein.

One will also appreciate that while the present invention is disclosed as installed on a mobile communications device, portions of the present invention may communicate or work in conjunction with a remote server or a series of servers. For example, the system embodiment of the present invention may be configured to update its virus definitions or compare received data against a larger virus signature database on a remote server. Alternatively, the mobile communications device may be configured to send a hash identifier for received data to one or more servers for analysis and/or evaluation. One server may contain the known good component 107, known bad component 106 and decision component 105 of the present invention, or the components may be distributed across two or more servers. The one or more servers may thereby perform the analysis using the hash identifier, and if analysis reveals that the hash identifier identifies recognizably safe data, then the one or more servers may notify the mobile communications device or instruct the device that it may accept and process the data. If the analysis reveals that the hash identifier identifies recognizably malicious data, then the one or more servers may notify the mobile communications device or instruct the device to reject the data and not process it further. If the analysis is inconclusive, then the one or more servers may request that the mobile communications device send the data identified by the hash identifier to a server for further analysis. Further analysis may be performed by a decision component 105 or manually. One will appreciate that other variations are possible without departing from this disclosure or the scope of the present invention.

B. Malware and Attack Detection Using Data Characteristics

The system architecture discussed above offers an improvement over prior art mobile communications device security systems that typically only include a known good detection method or a known bad detection method. Because the present invention incorporates a decision component 105 as well, it minimizes false-positive or false-negative detection errors common to prior art systems. Other advantages and improvements are discussed in this section that describes some of the analyses performed by the system embodiment of the present invention.

1. Known Good Characteristics

In an embodiment, the present invention may be configured to recognize good characteristics that all known good data should possess. Analyzing data for good characteristics may include the equivalent of applying a database or other data store of known good characteristics or logic asserting known good characteristics, and performing a comparison against the database. Alternatively or additionally, analyzing data for good characteristics may include the equivalent of applying logic asserting known good characteristics. The database or logic may not include all of the characteristics that may determine if data is good; however, if the data object lacks key known good characteristics, then the system can conclude that the data may be malicious and should be further analyzed, or alternatively, rejected outright. The database of known good characteristics or logic asserting known good characteristic may supplant the known good component 107 discussed above, or in some cases may replace it as a lightweight alternative. In other words, a list of all the known good data files and network data may be infinitely large, but the list of characteristics common to known good data files and known good network data may be much smaller. As such, the database of known good characteristics may be smaller in size than the known good database, and may therefore be more practical in mobile communications devices with less memory or processing resources.

One will appreciate that there are a number of characteristics common to known good data, but that these characteristics may differ depending upon whether the data is network data, a data file, or executable data. The present invention is able to evaluate all types of data receivable by a mobile communications device. For example, network data and data files may be examined for structure and state. This may involve checking the data against its associated metadata to confirm that the size, type and description match the data being described. Using this analysis, known good component 107 may be configured to allow or accept data that has valid statefulness and structure, and provide data that does not pass these tests to the known bad component 106 for further analysis or simply reject it outright. One will appreciate, however, that having valid statefulness and structure are not alone enough for concluding that a data file or network data is good, and further analysis by known bad component 106 and/or decision component 105 may be necessary. In other words, even though data analyzed by known good component 107 may result in a positive match finding that the data has recognizably good characteristics, or has a hash identifier matching known good data, the data may still be analyzed by known bad component 106 and/or decision component 105.

With regards to executable data, the list of known good executable applications for mobile communications devices is small. As such, known good component 107 may simply compare hash identifiers for gathered executable data and compare them against a stored database of known good executables. One will appreciate that other methods, such as validating the structure of an executable file format or validating any cryptographic signatures on an executable may be applied as well.

2. Known Bad Characteristics

In an embodiment, data may be compared using logic or a database or other data store of known bad characteristics. As such, if data has known bad characteristics, it may be considered malicious and may be rejected, deleted or quarantined. One will appreciate that the entire data object may have known bad characteristics, or part of the data object may have known bad characteristics, or a pattern in an object may be recognized as known bad, or the data object may yield a positive result from logic that performs a specific test for known bad characteristics. In such situations, it may warrant further analysis or confirmation to avoid an inaccurate result. Further analysis protects against situations in which the present invention may not recognize a specifically malicious data object that has not been recognized as such before. It is preferable to avoid mistakenly characterizing an object as more good than bad if it presents a security threat. Data that is recognized as known good, or is recognized has having sufficient known good characteristics, may be passed on to its intended destination. Data that fails to have all of the characteristics of a known good file or application, is found to be more bad than good, or is simply unrecognized may be passed along to the decision component 105 for further analysis.

As noted previously, data may be analyzed differently depending upon whether it is network data, file data, or executable data. Network data and file data may be encapsulated in various multi-layer protocols or formats. These protocols or formats may be analyzed using the system and methods described in co-pending U.S. patent application Ser. No. 12/255,614. If any of the data has known bad violations of its purported protocol or format, contains anomalous content or state transitions, or is invalid for the processor or subsystem to which it is directed, then known bad component 106 may reject this data as potentially malicious.

Known bad executables may be evaluated using full hash signatures, a string match anywhere or at a relative or absolute offset in the file, or a pattern anywhere or at a certain offset in the file consistent with known pieces or families of malware. If any of these characteristics are encountered, then the known bad component 106 may identify the data as malware and reject it. One will appreciate that other methods for detecting known bad data may be used as well, including but not limited to blocking executables which utilize a piece or specific combination of privileged functionality, or blocking executables which a server deems to have access frequency characteristics across many mobile devices indicative of viruses or malware.

3. Further Analysis

In some instances, data may not be immediately recognized as known good or known bad, and so decision component 105 may be used. One will appreciate that a key aspect of the present invention is its ability to analyze data that is not immediately known good or known bad. As mentioned above, this may require an analysis to determine if data is more good than bad, or more bad than good. As such, the present invention provides a sliding scale with which to assess the degree of how good or how bad received data may be. This permits a more precise measurement of not only how data may or may not harm a mobile communications device, but in light of this data, how the overall security state of the device may change.

The decision component 105 may utilize one or more types of internal decision systems to characterize whether data is good or bad. The decision component 105 is designed to detect security threats without specific signatures for the threats being protected against. In other words, decision component 105 may operate as an additional security component to compensate for any weaknesses from known good component 107 or known bad component 106.

One will appreciate that there are a number of decision systems that may be utilized by decision component 105, including but not limited to heuristic algorithms, rule-based or non-rule-based expert systems, fuzzy logic systems, neural networks, or other systems that may be used to classify a subject. In an embodiment, decision component 105 can analyze network data or files for possible security threats. For example, a fuzzy system may be configured to analyze the timing related to authentication actions over a given protocol, such as Bluetooth. A remote device connected to the local device via Bluetooth may repeatedly try to request access to a privileged resource on a device. Each time the remote device sends an authentication request, a window may pop up on the target device that requires user action before normal device interaction can resume. Because there is often no rate limiting built into the Bluetooth authentication system of mobile phones, a remote device can continue interrupting the local user by requesting access to the privileged resource and until the local user becomes frustrated and simply grants the request.

A fuzzy system can analyze data such as the timings between authentication requests, the results of previous authentication requests, and the time required for the user to respond to previous authentication requests. Such a system can detect when a remote device is attempting to repeatedly request authorization and the user is denying it quickly to prevent a situation where the user becomes frustrated and grants privileged access on his or her device to a remote attacker. Such a system can also be used to detect denial of service attacks, port scans, or other attacks that have a significant temporal component.

In another example, a heuristic algorithm may be used to detect the presence of shellcode in a data packet, stream, or data file in which none is expected. Such shellcode may be indicative that the data contains an exploit designed to perform a memory corruption attack where the attacker aims to have the supplied shellcode executed by the target device's processor.

In another example, the decision component 105 may contain a system for detecting anomalies in protocol behavior or file content so as to catch security threats that rely on unforeseen, yet out-of-the-ordinary mechanisms.

In another example, the decision component 105 may contain a system for analyzing authentication or other strings in network data or files that may be used to "socially engineer" a user. "Social engineering" attacks often manipulate the user into performing an action that is not in his or her best interest by using false information or otherwise presenting information to the user that he or she may interpret as legitimate but, in fact, is not. Such a system can examine the content of strings to determine if the data is of legitimate origin or is a potential social engineering attack. Examples of attacks this type of system may stop include: "phishing," "SMS phishing," Bluetooth device name manipulation, and others.

In an embodiment, the decision component 105 may analyze applications, libraries, or other executables on a mobile communications device. In an example, the decision component 105 may contain a neural network which analyzes characteristics of an executable and determines a security assessment based on pre-set connection characteristics. Such characteristics may be determined based on information contained in the executable file format or as a result of processing the content of the executable file.

In an example, the decision component 105 may contain a virtual machine-based decision system by which an executable can be classified by a set of rules that may be updated independently of the decision component itself. Such a system is able to add new logic to detect certain new classes of viruses on the fly without having to update the whole decision component. The system may pre-process the executable so that the virtual machine's logic can symbolically reference the executable rather than having to process the executable itself.

In an example, the decision component 105 may contain an expert-system which analyzes the behavior of an executable through function calls, system calls or actions an executable may take on an operating system. If an executable accesses sensitive system calls in a way that signifies malicious behavior, the system may flag that executable as potential malware and action may be taken.

The above examples illustrate how decision component 105 may utilize a number of analytical methods in order to fully evaluate the threat level of data received by or transmitted from the mobile communications device. Other examples may be contemplated without departing from the scope of this disclosure or the spirit of the present invention.

C. Data Analysis

Figure 2:
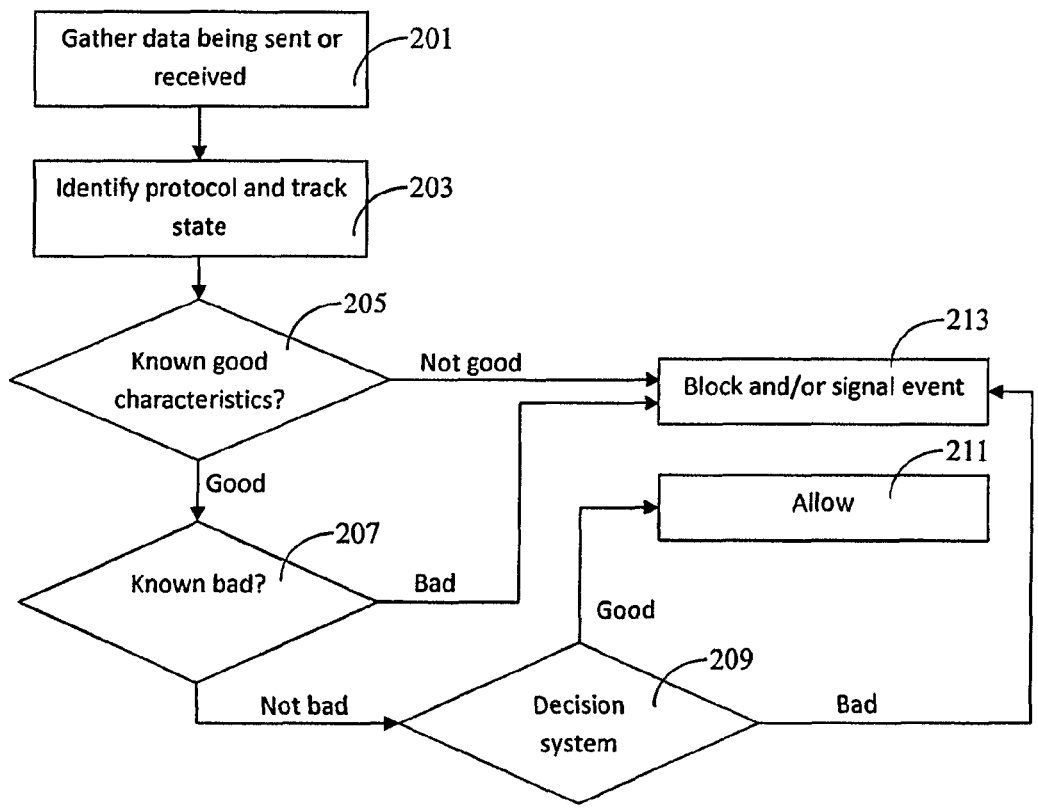
FIG. 2 is an exemplary flow diagram illustrating the steps of an embodiment of the present invention.
Figure 3:
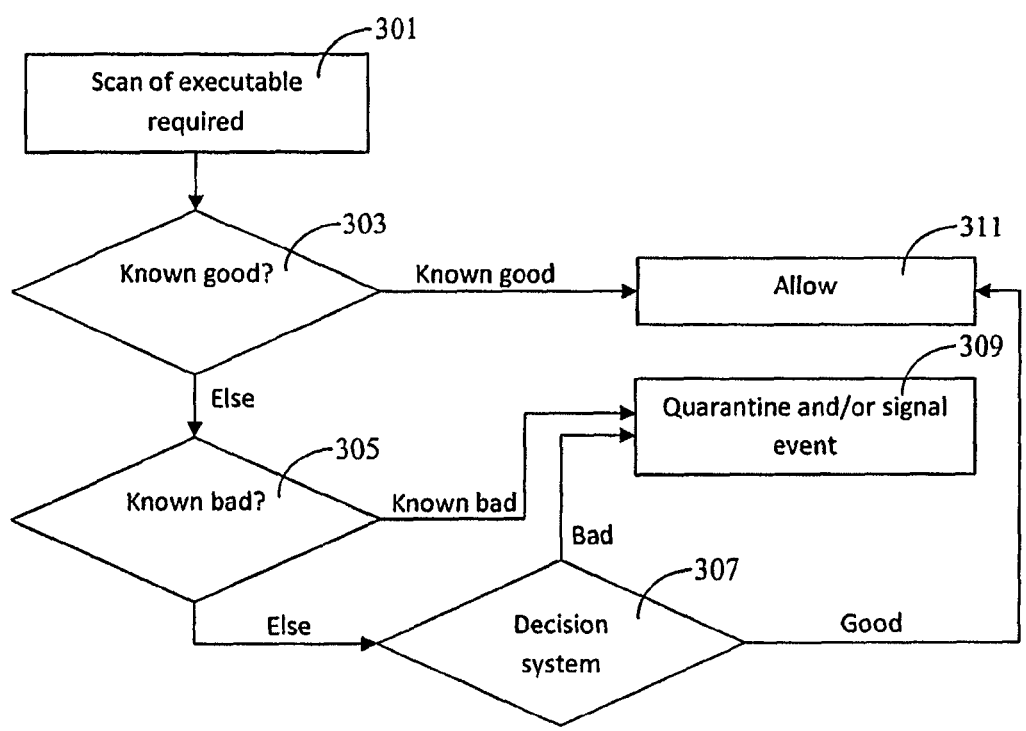
FIG. 3 is an exemplary flow diagram illustrating the steps of an embodiment of the present invention.

FIGS. 2 and 3 provide examples of how the system described above may apply its algorithm for evaluating data to detect malware and prevent attack. FIG. 2 illustrates the present invention evaluating network data or data files. FIG. 3 illustrates the present invention evaluating executable code. Each is discussed in turn.

1. Analysis of Network Data or Data Files

As shown in FIG. 2, step 201 may involve gathering data sent to or received from the mobile communications device. The data may be analyzed to identify its protocol and track state (step 203). One will appreciate that these steps may be performed in whole or in part by the system described in co-pending U.S. patent application Ser. No. 12/255,635. In step 205, known good component 107 may evaluate the gathered data for known good characteristics. Known good characteristics may include the characteristics previously discussed. If the data contains sufficient known good characteristics, it may be allowed to proceed to its intended destination (step 211) for processing, execution or other operation. Alternatively, it may be further analyzed by known bad component 106 to confirm that the data is truly safe (step 207). If known bad component 106 determines that the data is truly safe, then the data may be allowed to proceed to its intended destination (step 211). Decision component 105 may also be available to provide a final check (step 209) before allowing the data to proceed (step 211).

At any point during the analysis, if either known good component 107, known bad component 106 or decision component 105 determines that the data is not good, or affirmatively contains security threats, data inconsistencies, etc., then in step 213 the data will be blocked, rejected, deleted or quarantined. As discussed above, a signal event or security event information log may be updated to record the encounter with the contaminated data.

One will appreciate that the steps illustrated in FIG. 2 are merely exemplary and are not meant to limit the present invention to any one method.

2. Analysis of Executable Data

Like FIG. 2, FIG. 3 similarly depicts and exemplary method for evaluating executable data, including but not limited to applications, programs and/or libraries on the mobile communications device. In step 301, the executable is determined to need to be classified as either good or bad as a result from an attempt to access the executable or the executable being downloaded or otherwise transferred to the mobile device. The executable may or may not be pre-processed to determine a hash identifier or other characteristic before being evaluated by known good component 107. This evaluation may include comparing the executable's hash identifier against a database of known good characteristics, identifying whether the executable has sufficient known good characteristics, or any of the criteria discussed above. If the executable is recognized as known good, then in step 311, it may be allowed to execute its code or proceed to its intended destination for processing or other operation. If known good component 107 fails to allow the executable data, then known bad component 106 may perform its analysis (step 305). If known bad component 106 confirms that the executable is malicious, then the executable may be quarantined, rejected, or deleted, and the event may be logged (step 309). If known bad component 106 is unable to characterize the executable, then the decision component 105 may perform its analysis as described above (step 307). If decision component 105 ultimately determines that the executable is safe, then the executable is allowed (step 311). If decision component 105 ultimately determines that the executable is not safe, or remains unsure, then the executable may be quarantined (step 309). One will appreciate that since executables may contain code that can cause significant harm to the mobile communications device, it may require more rigorous analysis before the executable is allowed to proceed. Any of the steps illustrated in FIG. 3 may be altered without departing from this disclosure or scope of the present invention.

One will appreciate that the above examples contemplate that the present invention operates wholly on a mobile communications device. However, as previously discussed, it is also possible for portions of the present invention to reside on one or more remote servers. In the example of an antivirus system, a file's hash identifier may be transmitted to a remote server that then identifies whether the file is known good or known bad, or if the file contains known good or known bad characteristics. If the server does not recognize the file's hash identifier, the server may request that the file itself be transmitted to the server for analysis. This analysis may be automatic, or may be performed by a human. The server may furthermore analyze access patterns of a given executable between multiple devices to determine if the executable has virus or malware-like spreading characteristics. In an embodiment, analysis on the server is concurrent or in conjunction with an analysis performed by and on the mobile communications device. If the mobile communication device's antivirus system fails to classify the file, it may query the server for its results. Alternatively or in addition, the present invention on the mobile communications device may perform a heuristic analysis using the decision component 105 described above. The results from the local decision component 105 on the mobile communications device may be logged locally and/or transmitted to the server.

As described above, the present invention provides a robust and flexible security system for preventing attacks on a mobile communications device. By implementing the present invention, attacks from cyber-terrorists and other criminal groups may be thwarted. As a result, mobile communications devices can be used for many tasks with a reduced risk of security threats such as exploits, viruses, malware, social engineering attacks, denial of service attacks, and the like.

One will appreciate that in the description above and throughout, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of the preferred embodiments is not intended to limit the scope of the claims appended hereto.

What is claimed is:

1. In a server connected through a telecommunications network to receive and send data, having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

receiving data at the server from a mobile communications device;

applying by the known good component, logic on the data to determine if the data is safe;

when the known good component logic determines that the data is safe, allowing the data to be processed by the mobile communications device;

when the known good component logic does not determine that the data is safe, applying by the known bad component logic on the data to determine if the data is malicious;

when the known bad component logic determines that the data is malicious, rejecting the data from being processed by the mobile communications device;

when the known bad component does not determine that the data is malicious, performing, using the decision component, an analysis on the data to determine if the data is safe or malicious;

when the decision component determines that the data is safe, allowing the data to be processed by the mobile communications device; and when the decision component determines that the data is malicious, rejecting the data from being processed by the mobile communications device.

2. In a server connected through a telecommunications network to receive and send data, having a memory and a microprocessor, and further having software components for processing, analyzing and storing data, including at least a known good component for identifying data that is recognizably safe, and a known bad component for identifying data that is recognizably malicious, a method comprising:

receiving data at the server from a mobile communications device;

at the server, upon receipt of a signal from the mobile communications device that an analysis of the data by a mobile communications device security component has not been able to characterize the data as recognizably safe or malicious, applying by the known good component, logic on the data to determine if the data is safe, the logic examining the received data for valid statefulness and structure;

when the known good component logic determines that the data is safe, allowing the data to be processed by the mobile communications device;

when the known good component logic does not determine that the data is safe, applying by the known bad component logic on the data to determine if the data is malicious; and when the known bad component logic determines that the data is malicious, rejecting the data from being processed by the mobile communications device.

3. The method of claim 2, wherein the server further includes a decision component for evaluating whether data is safe or malicious, the method further comprising:

when the known bad component logic does not determine that the data is malicious, using the decision component, performing an analysis on the data by the decision component to determine if the data is safe or malicious;

when the analysis shows that the data is safe, allowing the data to be processed by the mobile communications device; and when the analysis shows that the data is malicious, rejecting the data from being processed by the mobile communications device.

4. In a server connected through a telecommunications network to receive data from and send data to a mobile communications device, the server having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

receiving data at the server;

applying by the known good component, logic on the data to determine if the data is safe;

when the known good component logic determines that the data is safe, sending the data to be processed by the mobile communications device;

when the known good component logic does not determine that the data is safe, applying by the known bad component logic on the data to determine if the data is malicious;

when the known bad component logic determines that the data is malicious, rejecting the data from being sent to the mobile communications device for processing;

when the known bad component does not determine that the data is malicious, using the decision component, performing an analysis on the data to determine if the data is safe or malicious;

when the decision component determines that the data is safe, allowing the data to be sent to the mobile communications device for processing; and when the decision component determines that the data is malicious, rejecting the data from being sent to the mobile communications device for processing.

5. In a server connected through a telecommunications network to receive data from and send data to a mobile communications device, the server having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

receiving data at the server;

sending the data to the mobile communications device;

applying by the known good component, logic on the data to determine if the data is safe;

when the known good component logic determines that the data is safe, sending instructions to the mobile communications device to process the data;

when the known good component logic does not determine that the data is safe, applying by the known bad component logic on the data to determine if the data is malicious;

when the known bad component logic determines that the data is malicious, sending instructions to the mobile communications device to not process the data;

when the known bad component does not determine that the data is malicious, using the decision component, performing an analysis on the data to determine if the data is safe or malicious;

when the decision component determines that the data is safe, sending instructions to the mobile communications device to process the data; and when the decision component determines that the data is malicious, sending instructions to the mobile communications device to not process the data.

6. In a server connected through a telecommunications network to receive data from and send data to a mobile communications device, the server having a memory and a microprocessor, and further having software components for processing, analyzing and storing data, including at least a known good component for identifying data that is recognizably safe, and a known bad component for identifying data that is recognizably malicious, a method comprising:

receiving data at the server;

applying by the known good component, logic on the data to determine if the data is safe;

when the known good component logic determines that the data is safe, sending the data to be processed by the mobile communications device;

when the known good component logic does not determine that the data is safe, rejecting the data from being sent to the mobile communications device for processing, and applying by the known bad component logic on the data to determine if the data is malicious;

when the known bad component logic determines that the data is malicious, rejecting the data from being sent to the mobile communications device for processing; and when the known bad component does not determine that the data is malicious, allowing the data to be sent to the mobile communications device for processing, wherein the mobile communications device comprises a decision component for analyzing whether the data is safe or malicious and for determining a disposition of the data as a result of the analysis, the mobile communications device processing the data when the decision component determines that the data is safe, and rejecting the data from being processed when the decision component determines that the data is malicious.

7. In a server connected through a telecommunications network to receive data from and send data to a mobile communications device, the server having a memory and a microprocessor, and further having software components for processing, analyzing and storing data, including a decision component for analyzing whether data is safe or malicious and for determining a disposition of the data as a result of the analysis, a method comprising:

receiving, from the mobile communications device, a request to process data using the decision component, wherein the mobile communications device comprises at least a known good component for identifying data that is recognizably safe, and a known bad component for identifying data that is recognizably malicious, the request being received from the mobile communications device when the known good component of the mobile communications device does not determine that the data is safe, and the known bad component of the mobile communications device does not determine that the data is malicious;

at the server, performing, using the decision component, an analysis on the data to determine if the data is safe or malicious;

when the decision component determines that the data is safe, sending instructions to the mobile communications device to process the data; and when the decision component determines that the data is malicious, sending instructions to the mobile communications device to not process the data.

8. In a mobile communications device having a network interface for receiving and sending data, a memory and a microprocessor, and further having software components for processing, analyzing and storing data, including a decision component for analyzing whether data is safe or malicious and for determining a disposition of the data as a result of the analysis, a method comprising:

receiving, from a server, data and a request to analyze the data using the decision component, wherein the server comprises at least a known good component for identifying data that is recognizably safe, and a known bad component for identifying data that is recognizably malicious, the request being received from the server when the known good component of the server does not determine that the data is safe, and the known bad component of the server does not determine that the data is malicious;

performing, using the decision component, an analysis on the data to determine if the data is safe or malicious; and when the decision component determines that the data is safe, processing the data.

9. The method of claim 8, further comprising logging, on the mobile communications device, the determination made by the decision component.

10. The method of claim 8, further comprising transmitting to the server the determination made by the decision component.

11. In a mobile communications device having a network interface for receiving and sending data, a memory and a microprocessor, and further having software components for processing, analyzing and storing data, including at least a known good component for identifying data that is recognizably safe, and a known bad component for identifying data that is recognizably malicious, a method comprising:

providing data on the mobile communications device;

applying a hash function to the data to create a hash identifier for the data;

comparing by the known good component, the data hash identifier against a database of hash identifiers of known good data stored in the mobile communications device memory;

when the comparison by the known good component results in a positive match, allowing the data to be processed by the mobile communications device;

when the comparison by the known good component does not result in a positive match, comparing by the known bad component, the data hash identifier against a database stored in the mobile communications device memory containing hash identifiers of known bad data;

when the comparison by the known bad component results in a positive match, rejecting the data from being processed by the mobile communications device;

when the comparison by the known bad component does not result in a positive match, sending the data to a server for processing, wherein the server comprises a decision component for analyzing whether the data is safe and for determining a disposition of the data as a result of the analysis, the server sending instructions to process the data when the decision component determines that the data is safe; and when the instructions to process the data is received from the server, processing the data.

12. In a mobile communications device having a network interface for receiving and sending data, a memory and a microprocessor, and further having software components for processing, analyzing and storing data, including at least a known good component for identifying data that is recognizably safe, and a known bad component for identifying data that is recognizably malicious, a method comprising:

providing data on the mobile communications device;

applying by the known good component, logic on the data to determine if the data is safe;

when the known good component logic determines that the data is safe, allowing the data to be processed by the mobile communications device;

when the known good component does not determine that the data is safe, applying by the known bad component, logic on the data to determine if the data is malicious;

when the known bad component logic determines that the data is malicious, rejecting the data from being processed by the mobile communications device when the known bad component does not determine that the data is malicious, sending the data to a server for processing, wherein the server comprises a decision component for analyzing whether the data is safe and for determining a disposition of the data as a result of the analysis, the server sending instructions to process the data when the decision component determines that the data is safe; and when the instructions to process the data is received from the server, processing the data.

13. In a mobile communications device having a network interface for receiving and sending data, a memory and a microprocessor, and further having software components for processing, analyzing and storing data, including at least a known good component for identifying data that is recognizably safe, and a known bad component for identifying data that is recognizably malicious, a method comprising:

providing data on the mobile communications device;

comparing by the known good component, the data against a database of characteristics for known good data stored in the mobile communications device;

when the comparison by the known good component does not result in a positive match, rejecting the data from being processed by the mobile communications device;

when the comparison by the known good component results in a positive match, comparing by the known bad component, the data against a database stored in the mobile communications device memory containing at least one of the data selected from the group consisting of characteristics for known bad data, known bad data signatures, and known bad data patterns;

when the comparison by the known bad component results in a positive match, rejecting the data from being processed by the mobile communications device;

when the comparison by the known bad component does not result in a positive match, sending the data to a server for processing, wherein the server comprises a decision component for analyzing whether the data is safe and for determining a disposition of the data as a result of the analysis, the server sending instructions to process the data when the decision component determines that the data is safe; and when the instructions to process the data is received from the server, processing the data.

14. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

applying a hash function to the data to create a hash identifier for the data;

comparing by the known good component, the data hash identifier against a database of hash identifiers of known good data stored in the mobile communications device memory;

when the comparison by the known good component results in a positive match, allowing the data to be processed by the mobile communications device;

when the comparison by the known good component does not result in a positive match, comparing by the known bad component, the data hash identifier against a database stored in the mobile communications device memory containing hash identifiers of known bad data;

when the comparison by the known bad component results in a positive match, rejecting the data from being processed by the mobile communications device;

when the comparison by the known bad component does not result in a positive match, using the decision component, performing an analysis on the data by the decision component to determine whether the data is from a legitimate origin or is a potential social engineering attack;

when the analysis determines that the data is from a legitimate origin, allowing the data to be processed by the mobile communications device; and when the analysis determines that the data is a potential social engineering attack, rejecting the data from being processed by the mobile communications device.

15. The method of claim 14, wherein the potential social engineering attach is at least one of a phishing attack, a short message service (SMS) phishing attack, and a Bluetooth device name manipulation attack.

16. In a server connected through a telecommunications network to receive data from and send data to a mobile communications device, the server having a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

receiving, by the server, a hash identifier for the data to be analyzed from the mobile communications device;

comparing, by the known good component, the data hash identifier against a database of hash identifiers of known good data stored in memory associated with the server;

when the comparison by the known good component
results in a positive match, sending an instruction to the
mobile communications device to allow the data to be
processed by the mobile communications device;
when the comparison by the known good component does
not result in a positive match, comparing by the known
bad component the data hash identifier against a database stored in memory associated with the server containing hash identifiers of known bad data;
when the comparison by the known bad component results
in a positive match, sending an instruction to the mobile
communications to reject the data from being processed
by the mobile communications device;
when the comparison by the known bad component does
not result in a positive match, receiving the data from the
mobile communications device;
using the decision component, performing an analysis on
the data by the decision component to determine
whether the received data is from a legitimate origin or is
a potential social engineering attack;
when the analysis determines that the data is from a legitimate origin, then sending an instruction to the mobile
communications device to allow the data to be processed
by the mobile communications device; and
when the analysis determines that the data is a potential
social engineering attack, then sending an instruction to
the mobile communications device to reject the data
from being processed by the mobile communications
device.

17. The method of claim 16, wherein the potential social engineering attach is at least one of a phishing attack, a short message service (SMS) phishing attack, and a Bluetooth device name manipulation attack.

18. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
providing data on the mobile communications device;
comparing by the known good component, the data against
a database of characteristics for known good data stored
in the mobile communications device;
when the comparison by the known good component does
not result in a positive match, rejecting the data from
being processed by the mobile communications device;
when the comparison by the known good component
results in a positive match, applying a hash function to
the data to create a hash identifier for the data, and
comparing by the known bad component, the data hash
identifier against a database stored in the mobile communications device memory containing hash identifiers
of known bad data;
when the comparison by the known bad component results
in a positive match, then rejecting the data from being
processed by the mobile communications device;
when the comparison by the known bad component does
not result in a positive match, then using the decision
component, performing an analysis on the data to determine if the data is safe or malicious;
when the analysis by the decision component shows that
the data is safe, allowing the data to be processed by the
mobile communications device; and
when the analysis by the decision component shows that
the data is malicious, rejecting the data from being processed by the mobile communications device.

19. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
providing data on the mobile communications device;
applying a hash function to the data to create a hash identifier for the data;
comparing by the known good component, the data hash
identifier against a database of hash identifiers of known
good data stored in the mobile communications device
memory;
when the comparison by the known good component does
not result in a positive match, rejecting the data from
being processed by the mobile communications device;
when the comparison by the known good component
results in a positive match, comparing by the known bad
component, the data against a database stored in the
mobile communications device memory containing at
least one of the data selected from the group consisting
of characteristics for known bad data, known bad data
signatures, and known bad data patterns;
when the comparison by the known bad component results
in a positive match, then rejecting the data from being
processed by the mobile communications device;
when the comparison by the known bad component does
not result in a positive match, then using the decision
component, performing an analysis on the data to determine if the data is safe or malicious;
when the analysis by the decision component shows that
the data is safe, allowing the data to be processed by the
mobile communications device; and
when the analysis by the decision component shows that
the data is malicious, rejecting the data from being processed by the mobile communications device.

20. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:
providing data on the mobile communications device;
applying a hash function to the data to create a hash identifier for the data;
comparing by the known good component, the data hash
identifier against a database of hash identifiers of known
good data stored in the mobile communications device
memory;
when the comparison by the known good component does
not result in a positive match, rejecting the data from
being processed by the mobile communications device;
when the comparison by the known good component
results in a positive match, applying by the known bad
component, logic on the data to determine if the data is
malicious;

when the known bad component logic determines that the data is malicious, rejecting the data from being processed by the mobile communications device when the known bad component does not determine that the data is malicious, using the decision component, performing an analysis on the data to determine if the data is safe or malicious;

when the analysis by the decision component shows that the data is safe, allowing the data to be processed by the mobile communications device; and when the analysis by the decision component shows that the data is malicious, rejecting the data from being processed by the mobile communications device.

21. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

applying by the known good component, logic on the data to determine if the data is safe;

when the known good component logic determines that the data is safe, allowing the data to be processed by the mobile communications device;

when the known good component does not determine that the data is safe, applying by the known bad component, a hash function to the data to create a hash identifier for the data, and comparing by the known bad component, the data hash identifier against a database stored in the mobile communications device memory containing hash identifiers of known bad data;

when the comparison by the known bad component results in a positive match, then rejecting the data from being processed by the mobile communications device;

when the comparison by the known bad component does not result in a positive match, then using the decision component, performing an analysis on the data to determine if the data is safe or malicious;

when the analysis by the decision component shows that the data is safe, allowing the data to be processed by the mobile communications device; and when the analysis by the decision component shows that the data is malicious, rejecting the data from being processed by the mobile communications device.

22. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

comparing by the known good component, the data against a database of characteristics for known good data stored in the mobile communications device;

when the comparison by the known good component does not result in a positive match, rejecting the data from being processed by the mobile communications device;

when the comparison by the known good component results in a positive match, applying by the known bad component, logic on the data to determine if the data is malicious;

when the known bad component logic determines that the data is malicious, rejecting the data from being processed by the mobile communications device when the known bad component does not determine that the data is malicious, using the decision component, performing an analysis on the data to determine if the data is safe or malicious;

when the analysis by the decision component shows that the data is safe, allowing the data to be processed by the mobile communications device; and when the analysis by the decision component shows that the data is malicious, rejecting the data from being processed by the mobile communications device.

23. In a mobile communications device having a network interface for receiving and sending data, a memory and a microprocessor, and further having software components for processing, analyzing and storing data, including at least a known good component for identifying data that is recognizably safe, a known bad component for identifying data that is recognizably malicious, and a decision component for analyzing whether data is safe or malicious and for determining a disposition of the data as a result of the analysis, a method comprising:

providing data on the mobile communications device;

applying by the known good component, logic on the data to determine if the data is safe;

when the known good component logic determines that the data is safe, allowing the data to be processed by the mobile communications device;

when the known good component does not determine that the data is safe, comparing by the known bad component, the data against a database stored in the mobile communications device memory containing at least one of the data selected from the group consisting of characteristics for known bad data, known bad data signatures, and known bad data patterns;

when the comparison by the known bad component results in a positive match, then rejecting the data from being processed by the mobile communications device;

when the comparison by the known bad component does not result in a positive match, then using the decision component, performing an analysis on the data to determine if the data is safe or malicious;

when the analysis by the decision component shows that the data is safe, allowing the data to be processed by the mobile communications device; and when the analysis by the decision component shows that the data is malicious, rejecting the data from being processed by the mobile communications device.

* * * * *